Sept. 29, 1942.  T. G. WEIHS  2,297,181
GLASS SUPPORTING APPARATUS
Filed Aug. 15, 1940   2 Sheets-Sheet 1
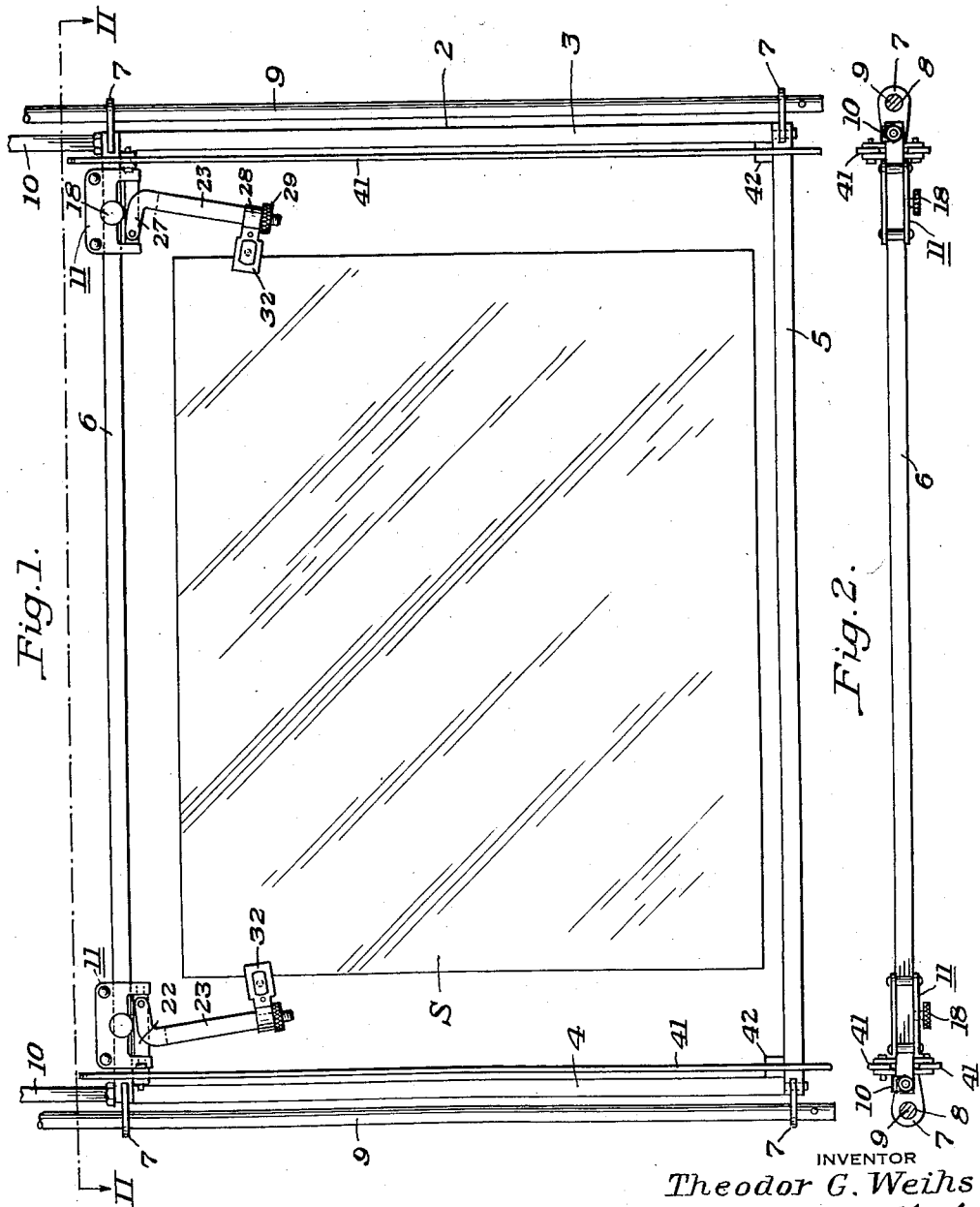
INVENTOR
Theodor G. Weihs

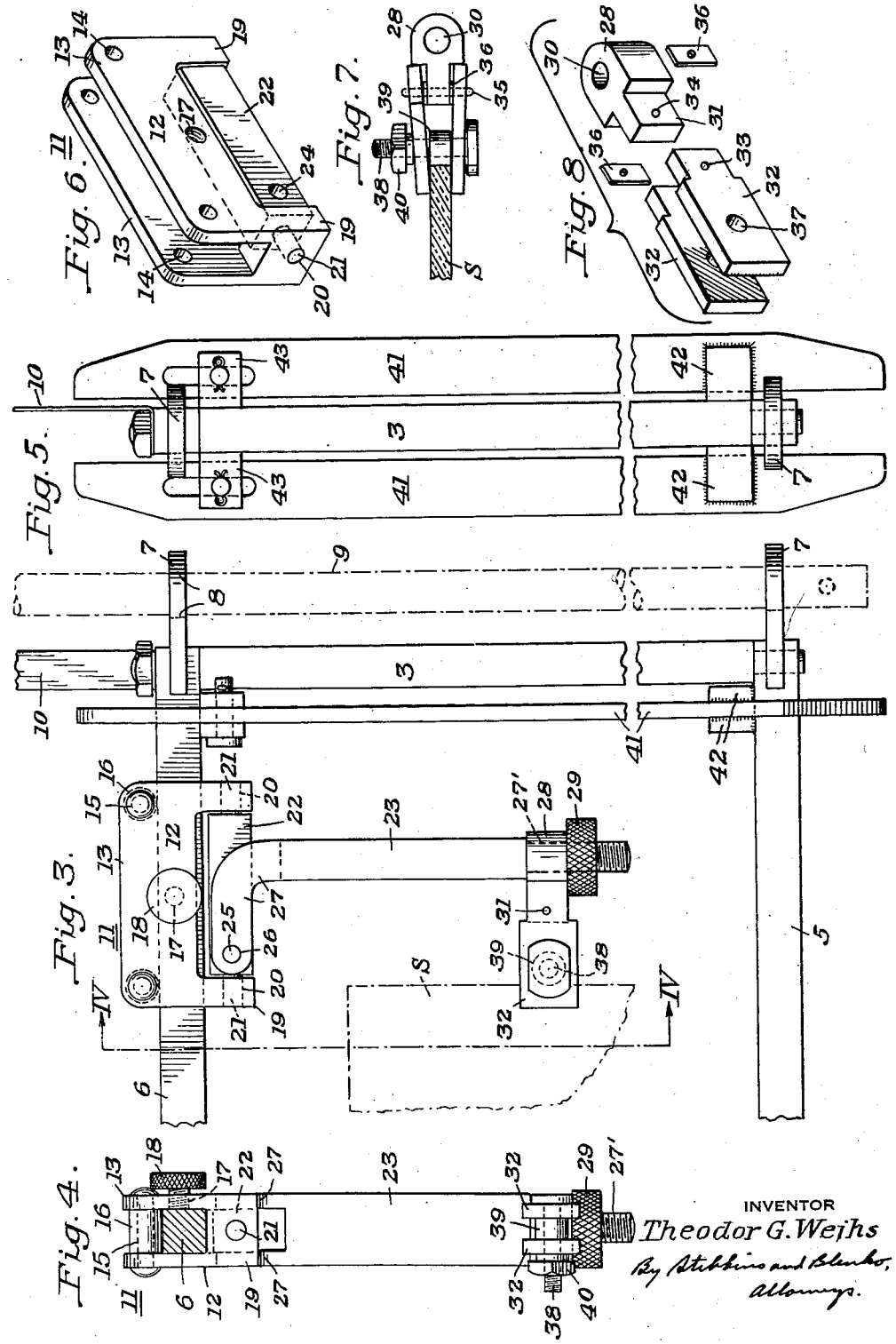

Patented Sept. 29, 1942

2,297,181

UNITED STATES PATENT OFFICE 2,297,181

GLASS SUPPORTING APPARATUS

Theodor G. Weihs, Pittsburgh, Pa., assignor to American Window Glass Company, Pittsburgh, Pa., a corporation of Pennsylvania Application August 15, 1940, Serial No. 352,739

11 Claims. (Cl. 49—14)

The present invention relates generally to glass supporting apparatus and more particularly to apparatus for supporting a glass sheet in a substantially vertical position during the heating and cooling operations involved in the tempering thereof. Heretofore considerable difficulty has been experienced in supporting glass sheets during the tempering thereof so that the sheet will not be marked or stretched out of shape. Consequently, the principal purpose of the present invention is to provide supporting apparatus which will not objectionably mar the sheets.

As is well known in this art, in the tempering of glass sheets it is first necessary to heat them to a temperature closely approximating the softening point. Thereafter the sheets are transferred from the heating equipment to the cooling apparatus where they are quickly chilled. During both of these operations the sheets are supported in a vertical position so that both faces can be heated and cooled uniformly and, due to the fact that the sheets are raised to such a high temperature during the heating operation, it is not possible to support the glass sheet in one way during the heating operation and to thereafter handle the glass sheet in any way so as to modify the character of the support until after the cooling operation takes place.

Heretofore in most of the commercial processes of manufacturing tempered glass the sheets have been supported by tongs having sharp grippers which are placed in contact with the faces of the glass sheet and which are pressed into tight engagement with the glass sheet by virtue of the downward pull of the sheet. Tongs of this character have been found objectionable in view of the fact that when the sheet is brought up to the desired temperature the grippers are pressed inwardly to a sufficient extent to permanently mark the sheet. Furthermore, in many cases the grippers deform the glass around the point of contact to an objectionable extent because the weight of the glass will cause some stretching during the time that it is held at the elevated temperatures required. Various other expedients have been proposed but so far as I am aware none of them have been satisfactory and the commercial art has continued to employ the objectionable tongs.

In accordance with the present invention I provide apparatus for supporting a glass sheet during the tempering operation which is of such character that the glass sheets are not appreciably marked at the points where the clamping members contact the glass sheet and which is of such character that a horizontal pull can be exerted on the sheet during the tempering so as to partially relieve the downward pull caused by the weight of the sheet. I have found that where the clamps which I provide by my invention are employed there is substantially no stretching of the glass sheet at the points where the clamps contact the sheet. In addition, the apparatus which I provide permits the sheet to move freely in any direction without causing forces to be exerted on the sheet which will cause bending of the soft sheet.

In the accompanying drawings I have shown for purposes of illustration only a preferred embodiment of my invention. In the drawings, Figure 1 is a front elevational view of the apparatus which I provide showing a glass sheet supported thereby;

Figure 2 is a section taken along the line II—II of Figure 1;

Figure 3 is an enlarged view of one side of the apparatus shown in Figure 1;

Figure 4 is a section taken along the line IV—IV of Figure 3;

Figure 5 is an end elevational view of the structure shown in Figure 3;

Figure 6 is a perspective view of the carriage for supporting the clamping arms;

Figure 7 is a detail showing the clamping fingers, and

Figure 8 is a disassembled perspective view of the clamping fingers and the supporting collar.

In the drawings the apparatus which I provide is shown applied to tempering the equipment in which the glass sheet is moved vertically between the heating furnace and the cooling equipment. The frame, indicated generally by the reference character 2, consists of vertically extending side members 3 and 4, a horizontally extending bottom bar 5 and a horizontally extending top supporting bar 6. At each corner of the frame a horizontally extending lug 7 is provided. Each lug has an opening 8 therein adapted to receive the guides 9 along which the frame is reciprocated. The frame is raised and lowered by means of straps 10 which are connected to the upper end of the frame and which extend upwardly and around winding drums or reels.

The glass sheet S is supported within the frame by means of clamps 11 which are movably mounted on the horizontally extending supporting bar 6. Each clamp embodies a carriage 12 having upwardly extending side plates 13 adapted to receive the bar 6 therebetween. These side plates are provided with holes 14 adapted to receive pins 15 on which are mounted rollers 16 which rest upon the supporting bar 6. One of the side plates 13 is provided with a hole 17 adapted to receive a set screw 18 for holding the carriage in any adjusted position along the bar 6. Each carriage has downwardly extending legs 19 having bearing openings 20 therein to receive the reduced ends 21 of a pin 22. By virtue of this type of mounting for the pins 22 they are rotatable about their axes which normally extend substantially horizontally.

Each rotatable pin 22 pivotally supports a clamp arm 23 which extends downwardly therefrom. Each pin 22 has a bearing hole 24 extending therethrough for receiving a pivot pin 25 which also extends through holes 26 in the arms 27 of the bifurcated upper end of the arm 23. The arms 27 of the bifurcated upper end of each clamp arm 23 extend at an angle to the main body of the clamp arm so that when the clamp arm is in position it will normally swing inwardly toward the glass sheet. Each clamp arm has a reduced end portion 27' at the lower end thereof for receiving a collar 28. The extreme end of the reduced portion 27' is threaded for receiving a nut 29 for holding the collar 28 on the arm, the collar being at all times rotatable about the axis of the arm. Each collar 28 has an opening 30 therein cooperating with the reduced end 27' of the arm 23 and a laterally extending projection 31. The fingers 32 for clamping the glass sheet are mounted on the projection 31, the inner end of each finger being provided with a hole 33 cooperating with the hole 34 in the projection. A pin 35 extends through these holes. Shims 36 may be positioned between the projection 31 and the fingers in order to properly space them for appropriate gripping of sheets of glass of different thicknesses. The fingers 32 are provided with holes 37 for receiving the screw 38. A collar 39 is mounted on the screw 38 and positioned between the two fingers to prevent them from being forced so closely together that they will place an undue strain on the glass at the point where the fingers come in contact with the glass. A nut 40 is threaded on the screw 38 for moving the fingers toward and away from each other. The inner faces of the outer ends of the fingers 32 are roughened in order to provide a better gripping action on the glass sheet.

In a vertical installation of the type illustrated in the drawings it is desirable to provide guides on the frame to prevent it from swinging sideways as it is moved into the heating furnace or furnaces. Consequently I mount laterally extending guides 41 on the frame 2. The guides on each side of the frame are connected together by a cross bar 42 which is welded to the guides. The upper ends of the guides are connected together by a cross bar 43.

In the use of supporting apparatus of the character described above, the carriages 12 are appropriately positioned on the bar 6 so that each will be located adjacent one side of the glass sheet. The fingers of the one clamp are then fastened to the one edge of the glass sheet and the fingers of the oher clamp then secured to the other edge of the sheet. In securing the latter clamp to the glass sheet care should be taken to see that both of the clamp arms extend inwardly toward the glass sheet as shown in Figure 1, and they should extend inwardly toward the sheet to a sufficient extent that when the weight of the glass sheet is supported by the clamping fingers there will be a small horizontal pull on the sheet by the clamps. This horizontal pull is highly desirable as it prevents sagging of the sheet when it is heated to the desired temperature.

It will be apparent from what has been stated above that the clamps which I provide are of such character that the glass sheet can move in practically any direction when supported thereby. The supporting pins mounted on the carriage are rotatable about horizontal axes and the clamp arms are rotatable about horizontal axes at right angles to the axes of the supporting pins. In addition the clamping fingers are carried by the clamp arms in such a way that they can rotate around the longitudinal axes of the arms which extend substantially vertically and at an angle to the horizontal axes mentioned above. I have found that with this arrangement of the supporting mechanism the glass sheets will not sag and will not be affected adversely by the supporting clamps.

While I have shown and described a preferred embodiment of my invention, it will be understood that I do not intend to be limited thereby and that my invention may be otherwise embodied within the scope of the appended claims.

I claim:

1. Apparatus for supporting a glass sheet in substantially vertical position during the tempering thereof comprising a supporting member, a pin mounted on the supporting member for movement about a substantially horizontal axis, a clamp arm depending from and pivotally mounted on the pin for movement about a substantially horizontal axis extending at right angles to the axis of said pin, and clamping fingers for clamping on a glass sheet carried by said clamp arm, said fingers being rotatable about the arm.

2. Apparatus for supporting a glass sheet in substantially vertical position during the tempering thereof comprising a supporting member, a pin mounted on the supporting member for movement about a substantially horizontal axis, a clamp arm depending from and pivotally mounted on the pin for movement about a substantially horizontal axis extending at right angles to the axis of said pin, clamping fingers for clamping on a glass sheet carried by said clamp arm, said fingers being rotatable about the arm, and means for moving the clamping fingers toward each other.

3. Apparatus for supporting a glass sheet in substantially vertical position during the tempering thereof comprising a supporting member, a pin mounted on the supporting member for movement about a substantially horizontal axis, a clamp arm extending downwardly from said pin, a pivotal mounting for said clamp arm, said pivotal mounting permitting movement of the arm about a substantially horizontal axis at right angles to the axis of said pin, and clamping fingers carried by said arm and rotatably supported thereon for rotation about the longitudinal axis thereof.

4. Apparatus for supporting a glass sheet in substantially vertical position during the tempering thereof comprising a supporting member, a pin mounted on the supporting member for movement about a substantially horizontal axis, a clamp arm extending downwardly from said pin, a pivotal mounting for said clamp arm, said pivotal mounting permitting movement of the arm about a substantially horizontal axis at right angles to the axis of said pin, and clamping fingers carried by said arm and pivotally secured thereto for movement about a vertically extending axis.

5. Apparatus for supporting a glass sheet in substantially vertical position during the tempering thereof comprising a supporting member, a pin mounted on the supporting member for movement about a substantially horizontal axis, a clamp arm extending downwardly from said pin, a pivotal mounting for said clamp arm, said pivotal mounting permitting movement of the arm about a substantially horizontal axis at right angles to the axis of said pin, and clamping fingers carried by said arm and pivotally secured thereto for movement about a vertically extending axis, said fingers having roughened surfaces for engagement with a glass sheet.

6. Apparatus for supporting a glass sheet in substantially vertical position during the tempering thereof comprising a supporting member, a pin rotatably mounted on the supporting member for movement about a substantially horizontal axis, a clamp arm depending from and pivotally mounted on the pin for movement about an axis at right angles to the axis of rotation of the pin, clamping fingers carried by the clamp arm, said fingers being rotatable about said arm in a plane vertical to the arm, and means for moving the clamping fingers toward each other.

7. Apparatus for supporting a glass sheet in substantially vertical position during the tempering thereof comprising a supporting member, a pin rotatably mounted on the supporting member for movement about a substantially horizontal axis, a clamp arm depending from and pivotally mounted on the pin for movement about an axis at right angles to the axis of rotation of the pin, a collar mounted on the arm for rotation about the axis thereof, clamping fingers mounted on said collar for movement toward each other, and means for moving the clamping fingers toward each other.

8. Apparatus for supporting a glass sheet in substantially vertical position during the tempering thereof comprising a horizontally extending supporting bar, two supporting carriages mounted on the bar, each carriage having spaced legs extending below the bar, a pin rotatable about a substantially horizontal axis mounted on the legs of each of said carriages, clamp arms, a pivot for pivotally supporting a clamp arm on each pin in a dependent position, the pivot of each clamp arm extending at right angles to the axis of rotation of its cooperating pin, and clamping fingers carried by each of said arms, said carriages being spaced apart in operation to permit the fingers carried by the clamp arms to engage opposite edges of a glass sheet.

9. Apparatus for supporting a glass sheet in substantially vertical position during the tempering thereof comprising a horizontally extending supporting bar, two supporting carriages movably mounted on the bar, each carriage having spaced legs extending downwardly below the bar and a pin carried by said legs, a clamp arm depending from each of said pins, a substantially horizontal pivot for supporting each clamp arm on one of said pins, and clamping fingers rotatably carried by each of said clamp arms, the axis of rotation of said fingers extending substantially at right angles to the axis of rotation of the clamp arms.

10. Apparatus for supporting a glass sheet in substantially vertical position during the tempering thereof comprising a movably mounted frame, a horizontally extending supporting bar carried by the frame, two supporting carriages movably mounted on said bar, each carriage having spaced legs extending below the bar, a pin rotatable about a substantially horizontal axis mounted on the legs of each of said carriages, a clamp arm depending from each pin, a pivotal mounting for each arm, each pivot extending at right angles to the axis of rotation of the cooperating pin, clamping fingers carried by each of said arms, and guides carried by said frame.

11. Apparatus for supporting a glass sheet in substantially vertical position during the tempering thereof including a supporting member, a pin carried by said supporting member, a clamp arm carried by and depending from the pin, said clamp arm being pivotally mounted on the pin for movement about a substantially horizontal axis, clamping fingers carried by said clamp arm, said fingers being rotatable about said arm, and means for moving the clamping fingers toward each other.

THEODOR G. WEIHS.